United States Patent [19]

Hamilton et al.

[11] Patent Number: 4,926,444
[45] Date of Patent: May 15, 1990

[54] DATA TRANSMISSION METHOD AND APPARATUS BY PERIOD SHIFT KEYING (TSK)

[75] Inventors: Scott L. Hamilton, Duluth; Michael P. Harney, Atlanta; David J. Naddor, Doraville; James O. Farmer, Lilburn; Richard B. Frederick, Doraville; Randolph J. Schaubs, Stone Mountain, all of Ga.

[73] Assignee: Scientific-Atlanta, Inc., Atlanta, Ga.

[21] Appl. No.: 187,978

[22] Filed: Apr. 29, 1988

[51] Int. Cl.$^5$ .............................................. H04L 5/26
[52] U.S. Cl. ......................................... 375/9; 375/62; 375/89; 375/49; 332/110; 329/300
[58] Field of Search ................... 375/9, 44, 45, 51, 46, 375/47, 48, 49, 50, 62, 67, 82, 83, 88; 329/110; 332/9, 16; 379/96; 360/43

[56] References Cited

U.S. PATENT DOCUMENTS

| | | | |
|---|---|---|---|
| 3,349,328 | 10/1967 | Hunkins et al. | 375/49 |
| 3,454,718 | 7/1969 | Perreault | 375/49 |
| 3,522,539 | 8/1970 | Levine et al. | 375/80 |
| 3,761,625 | 9/1973 | Bruene | 332/9 R |
| 4,485,347 | 11/1984 | Hirasawa et al. | 329/50 |
| 4,528,675 | 7/1985 | Esterling et al. | 375/9 |
| 4,551,846 | 11/1985 | Takeda et al. | 375/82 |
| 4,569,060 | 2/1986 | Esterling et al. | 375/51 |
| 4,573,166 | 2/1986 | Frederick | 375/9 |
| 4,578,798 | 3/1986 | Divjak, Jr. et al. | 375/42 |
| 4,580,276 | 4/1986 | Andruzzi, Jr. et al. | 375/42 |
| 4,689,801 | 8/1987 | Nurczyk et al. | 375/9 |
| 4,691,342 | 9/1987 | Waldron et al. | 379/98 |

FOREIGN PATENT DOCUMENTS 58-114552 7/1983 Japan .
58-114651 7/1983 Japan .
58-114652 7/1983 Japan .

OTHER PUBLICATIONS

HF Communications: A Systems Approach, by Nicholas M. Maslin, pp. 169–179; Pitman Publishing, London, 1987.

Primary Examiner—Benedict V. Safourek
Assistant Examiner—Tesfaldet Bocure
Attorney, Agent, or Firm—Banner, Birch, McKie & Beckett

[57] ABSTRACT

Apparatus for transmitting and receiving a period shift keyed data stream comprises a data processor such as a microprocessor which may control the generation of the waveform as well as the determination of the bit values of an incoming signal. When the data to be transmitted comprises a plurality of data values, each data value is represented by a different predetermined frequency. Further, each data value is represented by the transmission of the predetermined frequency for a predetermined transitionary interval plus one cycle or period. One portion of the transitionary interval precedes and the remaining portion follows the one cycle. For example, the data value may be represented by a three cycle burst of frequency such that, in determining the represented data value, two cycles of transitionary interval are detected but ignored and the central cycle of the three cycle burst is timed for determining the data value by edge detection techniques. Consequently, transitionary influences caused by changes in frequency do not adversely affect data value determination.

33 Claims, 7 Drawing Sheets

DATA TRANSMISSION METHOD AND APPARATUS BY PERIOD SHIFT KEYING (TSK)

BACKGROUND OF THE INVENTION

1. Technical Field

The present invention relates to the field of data transmission methods and apparatus and, more particularly, to such a method and apparatus involving a period shift keying of two or more predetermined frequencies, each representing a data value, wherein the number of transmitted cycles of each frequency per data value is predetermined.

2. Description of Related Art

Data transmission techniques are known which involve a keying of at least two predetermined frequencies wherein, at a receiver of a data transmission, data is recovered either from the phase (PSK) or frequency (FSK) of the transmitted frequencies. At a transmitter one bit value is represented by one frequency and the other bit value by a second frequency while at a receiver the data values are determined by either the frequency or phase of the received signal.

Implementations of either FSK or PSK data transmission involve a considerable investment in hardware for implementation comprising counters, registers, filters, discriminators, oscillators, dividers, comparators, amplifiers and delay circuits, each having particular purpose depending upon the implementation sought. For example, an oscillator output frequency may be divided by separate integers to the result that two predetermined frequencies may be provided which are keyed depending upon the incoming data stream. At a receiver, a discriminator is coupled to the output of filters for distinguishing the transmitted frequencies and hence the transmitted data values.

Such implementations overlook the opportunity to apply the internal capabilities of known microprocessors for serving as data transmitters and receivers, i.e., microprocessors may comprise many of the components found in data transmission and reception apparatus. Furthermore, it is becoming more and more common to include microprocessors in electronic apparatus generally which may require an interface to a data transmission medium. For example, the personal computer is but one example of electronic apparatus comprising a microprocessor which may be applied simultaneously for both self control and control of a data transmission interface with a telecommunications line. Besides personal computers other such electronic apparatus include cable television set-top terminals, alarm and energy management systems.

According to published Japanese patent application No. 58-114552 published Jul. 7, 1983, a frequency shift keying demodulation circuit has been constituted with a general-purpose microprocessor. The incoming signal is passed via a buffer amplifier, a low pass filter, an active bandpass filter, a limiter, and a comparator to a terminal of an input port of a microprocessor. It is the microprocessor which monitors the zero crossings of frequencies incoming to the terminal and, by comparison of the zero crossing time with a predetermined threshold value, determines the bit values of the transmitted data stream.

While such teachings demonstrate that efforts have been undertaken to efficiently utilize the attributes of known microprocessors, there still remains a requirement in the art to achieve yet further reductions in costs of hardware and to more efficiently utilize a microprocessor for, for example, data transmission as well as data reception.

SUMMARY OF THE INVENTION

Consequently, it is an object of the present invention to provide an extremely efficient data transmission method and apparatus.

It is a further object of the present invention to utilize a microprocessor for both data transmission and data reception.

It is a still further object of the present invention to provide a more efficient data transmission format and resulting method which recognizes the realization of hardware components capable of implementation in the microprocessor.

In order to accomplish these objects, the operating characteristics of known microprocessors were examined and certain attributes exploited in the present invention. For example, it was recognized that microprocessors are readily adapted for data pulse edge detection. Also, they are not particularly capable of discriminating during intervals of transitionary influences, such as occurs when a required frequency changes value between receipt of one cycle at one frequency and one cycle at the other frequency in a dual frequency FSK or PSK system. In other words, microprocessors much more easily recognize noise-free data. In the present invention, each transmitted frequency represents at least one bit value. Also, the bit value is represented by the period of one cycle and the period of this cycle is determined by edge detection. Furthermore, there is provided in the transmitted signal an intentional transitionary interval of, for example, two cycles, one cycle at each frequency, between intervals of data determination.

The transmitted data thus involves in an exemplary embodiment three cycles at one frequency representing one bit value and three cycles at a second frequency representing the other bit value. The measurement of the period of the centrally transmitted cycle determines the bit value. If several (more than two), for example, four frequencies are transmitted in a several frequency embodiment representing a four bit nibble, still three cycles at each frequency would be transmitted. The first cycle could be regarded as transitionary, the second as containing the measurable period and the third as transitionary as well.

In a receiver algorithm, the microprocessor detects and counts the transitionary intervals where transition influences may corrupt the data by changing the duration of the transitionary interval and concentrates on the second cycle of the three cycle transmission. Consequently, transitionary influences have little or no effect on accurate data recognition by the microprocessor. The two transitionary cycles occurring during frequency changes are ignored by the microprocessor except for the limited purpose of counting edges to insure that they have occurred. The second transmitted cycle is counted as to its duration, i.e. its period, and compared with a threshold value; hence the name period shift keying (TSK) attaches to the present format. Depending on whether the count representing the period of the centrally transmitted cycle is above or below a threshold value, the transmitted bit value is determined. In a transmitter algorithm, the microprocessor sets a cycle counter to three cycles and sets its output high or low respectively for half period intervals until all three cycles of a fetched bit value are transmitted. Thus, the two transmitted frequencies may be simply transmitted without an additional carrier frequency over a baseband channel.

With respect to apparatus for interfacing transmission channels, it is recognized that for the most part apparatus comprising a period shift keying, data transmitter and receiver are contained within the microprocessor. However, to assure proper levels are established and frequency boundaries maintained, additional interface apparatus comprising filtering and amplification circuitry may be additionally required depending on the transmission channel application. For example, in the construction of a data modulator or demodulator embodiment for a telephone channel, amplification, filtering, supervision and tone detection, signalling, equipment protection and termination circuits may be required. In other applications it may be appropriate to provide a source of carrier for modulating the period shift keyed signal to the carrier frequency for transmission either as a baseband channel or multiplexed with other channels in a broadband carrier system.

These and other features and applications will come to mind to one of skill in the art from the following detailed discussion of a dual frequency baseband embodiment in view of the drawings.

DETAILED DESCRIPTION

Figure 1:
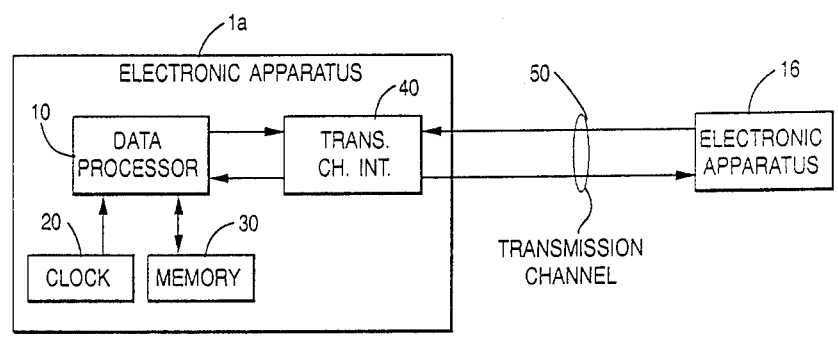
FIG. 1 is a schematic block diagram of electronic apparatus comprising a data processor and a transmission channel interface in accordance with the present invention for data transmission and reception by period shift keying.

Referring to FIG. 1, there is shown electronic apparatus 1a in accordance with the present invention comprising a data processor 10 or other similar control apparatus for controlling a data transmission and reception by period shift keying. Data processor 10 is most conveniently in the form of a microprocessor but as will be seen may comprise a much larger data processor such as a minicomputer or a main frame computer. Electronic apparatus 1a, by way of example, comprises a personal computer, an alarm system control unit, an energy management system control unit, a cable television terminal or other similar apparatus in which data processor 10 may be shared for accomplishing self control or for reacting to external control either by way of a transmission channel 50 or by way of connected peripheral devices (alarms, keyboards, sensors, remote controls or displays). Typically, electronic apparatus 1a will be connected via transmission channel 50 to similar or related electronic apparatus 1b.

Transmission channel 50 may be a narrowband data channel defined as one not exceeding the bandwidth of a standard telephone channel or may comprise a wideband data channel as for example may be provided over a 1.544 megabit pulse code modulated telephone carrier line, a larger bandwidth television channel, or other wideband channel.

Electronic apparatus 1b with apparatus 1a communicates may comprise a large main frame computer or electronic apparatus similar to apparatus 1a. For example, in a cable television application, electronic apparatus 1b may be a billing computer located at a cable television headend capable of maintaining billing records for hundreds of thousands of subscribers.

Associated with data processor 10 is a clock circuit 20 for clocking the operation of processor 10. In one embodiment, clock circuit 20 may provide a four megahertz clock signal permitting a high degree of discrimination in timing the generation and determination of narrowband period shift keyed data signals as will be described herein.

Also associated with data processor 10 is a memory 30 for storing data transmission and reception algorithms as well as other software for self-control and external control functions. Memory 30 may be internal processor memory or external (so-called outboard) memory. Memory 30 also comprises random access memory for temporary or buffer storage of data to be transmitted or data which was recently received. Memory 30 further stores period shift keyed data parameters, for example, the periods of the predetermined frequencies of period shift keyed data transmission, transitional interval durations, and threshold timing values for data value determination.

In accordance with the principles of the present invention, most of the activity associated with data transmission and reception is conducted by data processor 10. Data processor 10 transforms raw data into a period shift keying format for transmission over a baseband or multiplexed data transmission channel 50. Data processor 10 further receives a period shift keyed data stream and decodes the encoded data into a raw bit pattern of ones and zeroes.

On the other hand, depending on the characteristics of transmission channel 50, a transmission channel interface 40 is required to assure an appropriate power level for transmission, filter the signal to assure an appropriate pass band, and effectuate a modulation with a carrier frequency or a multiplexing with other data channels if required. Normally, for example, for a narrowband telephone channel, only active filtering circuits for transmission and reception and a reference comparator for data reception comprise transmission channel interface 40.

Figure 2:
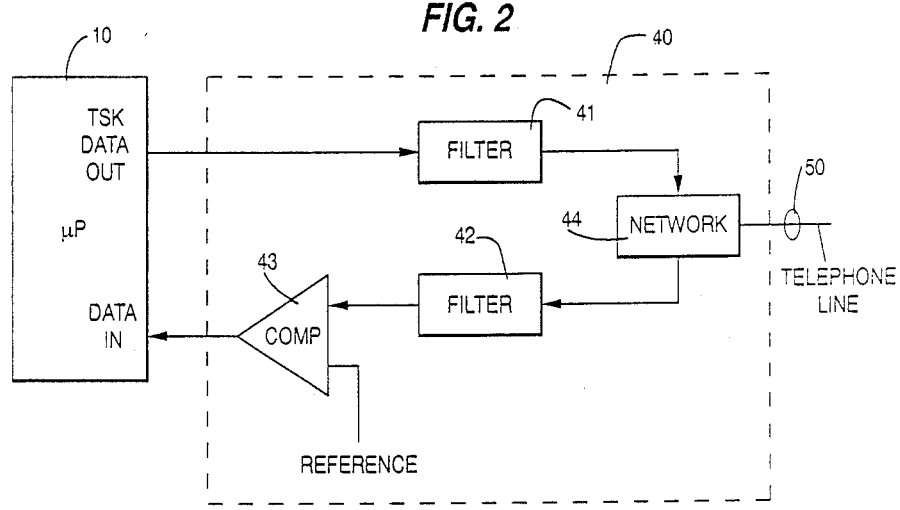
FIG. 2 is a schematic block diagram of a microprocessor and transmission channel interface similar to that shown in FIG. 1 adapted for application with a telephone line transmission channel.
Figure 5:
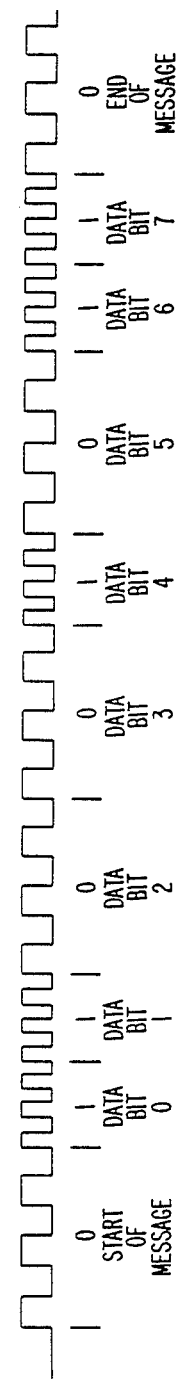
FIG. 5 is an exemplary waveform output of the microprocessor of FIG. 2 in practicing the algorithm flowchart of FIG. 3.

Referring more particularly to FIG. 2, there is shown an exemplary embodiment of the present invention for application with a telephone line transmission channel 50 comprising, for example, a telephone cable pair 50 known in telephone jargon as the tip and ring. The data processor 10 of FIG. 1 is more particularly shown in FIG. 2 as comprising a microprocessor 10 having a TSK data out terminal and a data in terminal. Transmission channel interface 40 is more particularly shown as comprising filters 41 and 42, comparator amplifier 43 and telephone network 44. Telephone line terminating network 44 provides a matching impedance termination for the telephone line 50, a line protection circuit, ringing detection and signaling circuits, tone or dial pulse address signaling circuits and on/off hook supervision circuits as required. If the apparatus shown in FIG. 2 originates a telephone connection to a terminal apparatus over telephone line 50, microprocessor 10 may not only control the transmission and reception of data but may also control telephone network circuit 44 as well by way of a control connection (not shown). Once the connection is established, the microprocessor may output TSK data in a form similar to that shown in FIG. 5. Referring briefly to FIG. 5, a start of message indicator may be indicated by the transmission of a predetermined bit, i.e. a zero, or bit sequence. A similar indicator or such an indicator followed by a pause may indicate the end of a message. All transmitted bit values in the depicted exemplary dual frequency TSK data stream shown comprise a one cycle transitionary interval, a single cycle for determining bit value, and a third cycle transitionary interval. Consequently, transition influences occurring during a transition from one frequency to the other do not influence the single cycle of data which will be acted upon by a corresponding data receiver at the other end of the telephone line.

In order to prepare the square wave output for transmission over the telephone line 50, filter 41 is shown coupled to the TSK Data Out terminal of the microprocessor 10. Filter 41 is most conveniently an active filter to assure an appropriate power level of the data stream to be transmitted and to filter out unwanted high and low frequency components. The output of the active filter 41 is passed by telephone network circuit 44 to the telephone line 50.

Upon the completion of transmission in a direction toward the distant terminal, an asynchronous or return data transmission at least acknowledging receipt of the transmitted data may be expected. Consequently, a more sine wave appearing data signal (i.e. FIG. 6) than the square wave shown in FIG. 5 at possibly a relatively low power level may be received via telephone network 44 at filter 42. Filter 42 assures an appropriate level and passband at the input to comparator 43. By comparing the incoming signal with a reference and providing a more square pulse stream output, comparator 43 may be more likened to an AND gate than to a comparator amplifier. The output of comparator 43 is provided to the TSK Data In terminal of microprocessor 10.

Figure 4:
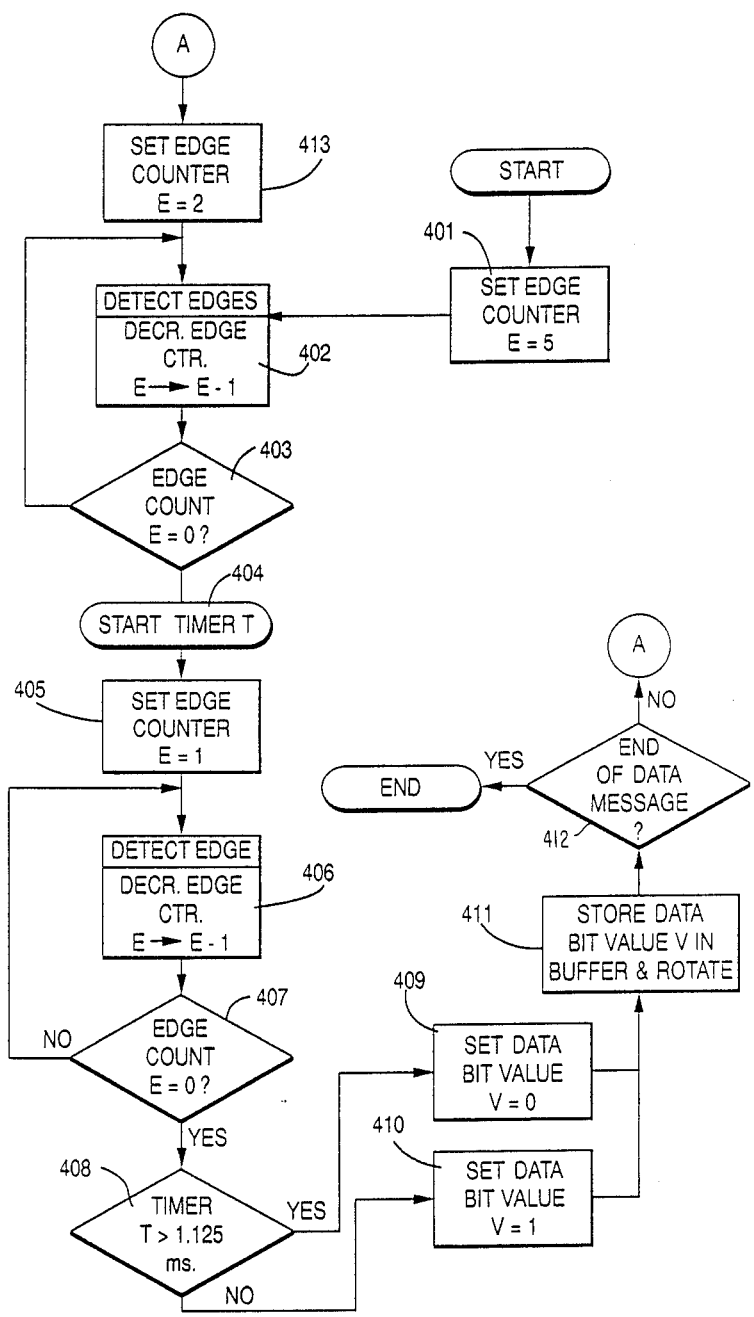
FIG. 4 is a flowchart of an algorithm for a period shift keying data reception in accordance with the invention.

The microprocessor 10 now operating under a receive algorithm shown in flowchart form in FIG. 4 first recognizes the start of message indicator and then concentrates on its task of ignoring any transitionary intervals by measuring the duration of the period of the centrally transmitted cycle of each three cycle frequency burst. By comparing the calculated duration with a reference threshold value, the microprocessor 10 determines the transmitted bit value.

Figure 3A:
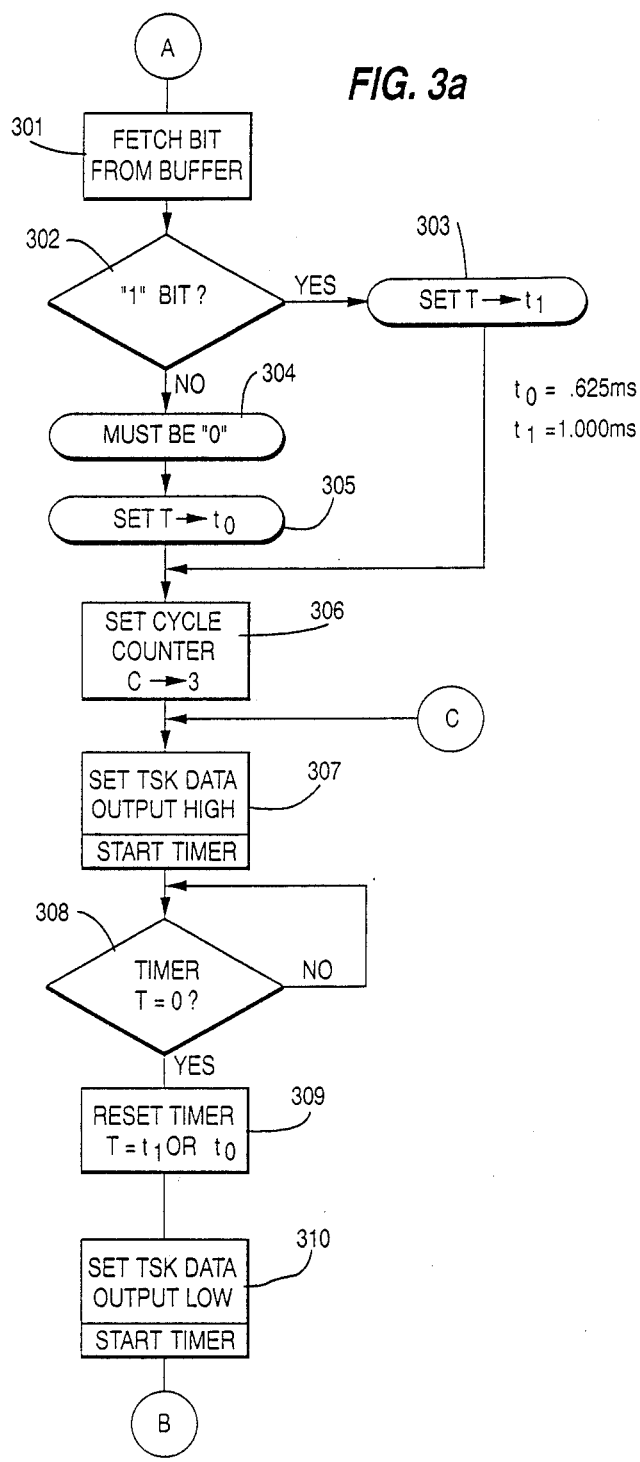
FIG. 3a and 3b together are a flowchart of an algorithm for a period shift keying data transmission in accordance with the invention.
Figure 3B:
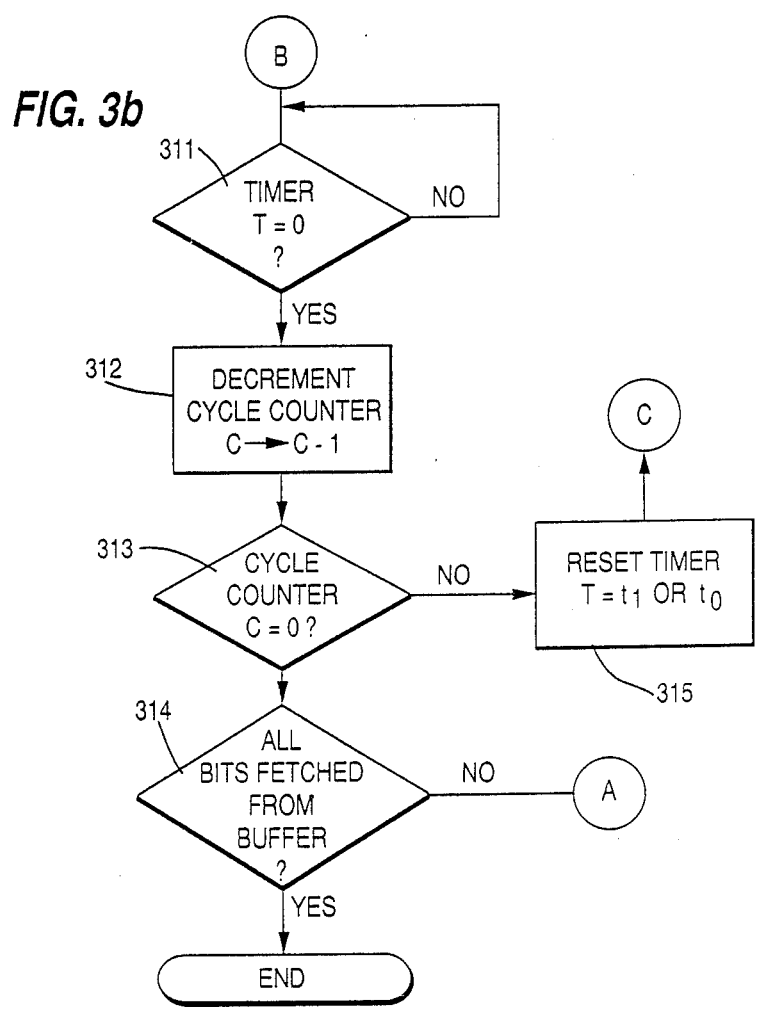

Referring now to FIG. 3, comprising FIGS. 3a and 3b, one algorithm for generating a period shift keyed data stream in accordance with the invention will be discussed. The depicted flowchart assumes a dual frequency embodiment just as does the TSK data stream depicted in FIG. 5 and the analog waveform of FIG. 6. A dual frequency embodiment envisions the application of two different frequencies for transmitting a binary value of one or zero. In particular it is considered in the flowchart that the two frequencies are 800 hertz and 1000 hertz. For a four value bit stream, one might choose 600, 800, 1000, and 1200 hertz. However, in choosing frequency values, one should consider the C type characteristic of a typical telephone channel and avoid telephone carrier signaling and other telephone signaling frequencies such as 1600 hertz which may result in so-called "talk-off" or unwanted disconnects.

Figure 6:
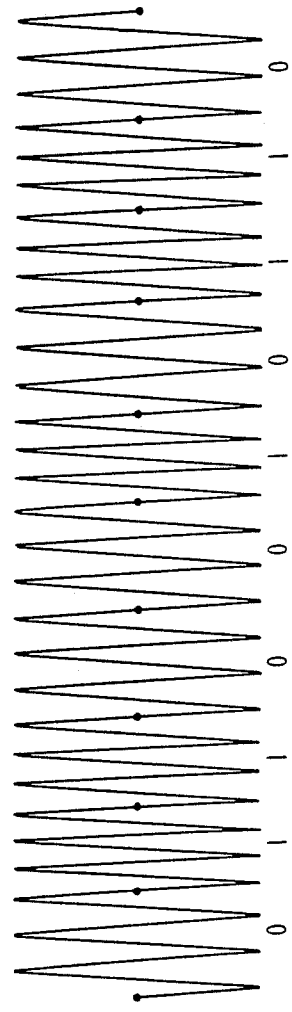
FIG. 6 is an exemplary analog waveform output of the telephone channel interface circuit of FIG. 2.

For the purpose of discussing the flowchart of FIG. 3, reference should be made to FIGS. 5 and 6 where exemplary output waves are shown. First, it is appropriate to assume that the data message 0110010110 is stored in buffer memory 30 (FIG. 1) for transmission and that a telephone connection has been established to a distant termination over telephone line 50. As already described, the first and last zeroes may indicate the start of a message and the end of a message respectively while the actual data is 11001011 or an eight bit byte. Also, it is important to note that, with respect to the transmission of a zero represented by a period of 1.25 milliseconds, a three cycle burst at 800 hertz is transmitted as shown in FIGS. 5 and 6. Consequently, a half cycle period value $t_0$ as shown in FIG. 3a is equal to 0.625 milliseconds. With respect to the transmission of a one represented by a period of 1.0 milliseconds, a three cycle burst at 1000 hertz is transmitted as shown in FIGS. 5 and 6. Consequently, a half cycle period value $t_1$ as shown in FIG. 3 is equal to 0.5 milliseconds.

It is also important to note again that data processor 10 may be performing other tasks at the same time as it is performing the algorithms of FIG. 3 (or FIG. 4). That is, it may be scanning a keyboard, producing a display or performing other responsibilities on an interrupt, multi-tasking, or multi-processing basis.

Now, referring to FIG. 3a, circle A represents the start of the algorithm as well as a connecting point for decision box 314 described hereinafter. Microprocessor 10 retrieves the first bit from buffer memory 30 which in the present example is a zero, start of message indicator. At decision box 302, the question is asked is the fetched bit a one (or a zero)? Since the bit value is a zero, the answer is No and box 304 is entered assuming a zero value. On the other hand, had the value been a one, the answer would be yes and box 303 entered. If more data values and more frequencies and period values required than two, this section of the algorithm would necessarily be expanded to set additional values not shown, i.e., $t_2$, $t_3$ and so on.

Boxes 303 and 305 set the appropriate half cycle period interval depending upon the bit value at $t_0$ (0.625 milliseconds) for a "0" and $t_1$ (0.5 milliseconds) for a "1" respectively. Thereafter, box 306 is entered in which a cycle counter parameter C is set to three for counting down a three cycle burst at the determined frequency level 800 or 1000 hertz respectively. In another embodiment a larger or smaller transitionary interval than two of these three cycles would require further modification of the depicted algorithm.

After the cycle counter C is set to 3, box 307 is entered at which the TSK data output of microprocessor 10 (FIG. 2) is set to High and a timer immediately started. Decision box 308 represents the continuous monitoring of timer T until the time $t_0$ or $t_1$ expires and equals zero. If the timer for a half cycle has reached zero, then the timer is reset at box 309 and the TSK Data Output is set Low at box 310. Also at box 310, the timer is again started.

Box 311, like box 308, represents the continuous monitoring of the timer T to see if time has expired. Once time has expired, one complete cycle of square wave has been generated at the output of microprocessor 10 as shown in FIG. 5 or in analog form at the transmission channel as shown in FIG. 6.

Now at box 312, the cycle counter C is decremented by one. At decision box 313, the question is asked whether all three cycles at 800 hertz have been generated yet, that is, is C=0? Since the answer is No, box 315 is entered which resets T to the appropriate value and returns to circle C of FIG. 3a where, beginning at box 307 a second cycle of the three cycle burst is generated.

After a third pass through boxes 307-313, the cycle counter is finally equal to zero and so the answer is yes. Decision box 314 is entered questioning whether all bits have been fetched from the buffer memory 30. Since only the start of message three cycle burst has been generated by microprocessor 10 thus far, circle A is indicated. Consequently boxes 301-315 are practiced for the next data bit which is a one and so on until 0110010110 is transmitted. Finally, all bits are fetched and the END is reached.

Once a distant terminal receives a data message, it can be assumed that a return message will be received by microprocessor 10 which is prepared for asynchronous data transmission and will now be under the control of the algorithm depicted in flowchart form in FIG. 4. Consequently, microprocessor 10 of FIG. 2 may be applied as an asynchronous data modem. Alternatively, synchronous data transmission and reception may be practiced by microprocessor 10 on an interrupt or other basis as previously suggested.

Referring to FIG. 4, after the START box has been entered suggesting a change in microprocessor operation to data reception, box 401 is entered for the purpose of setting an edge count parameter to the value five. By this operation, the three cycles of the start of message indicator and a transitionary interval of one cycle will be ignored represented in this example by five pulse rising edges. As indicated earlier, microprocessor 10 is more adaptable to detecting edges, than, for example, zero crossings.

At box 402, edges are detected and with each edge, the edge counter E is decremented by one. Since there is only one edge in the edge counter parameter at this time, at box 403, the answer to the question is E now equal to zero will be yes.

At box 404, a timer T is started for measuring the second cycle of the three cycle burst, the first cycle having been detected but ignored at box 402. Now, the edge counter E is set to one at box 405.

Box 406 detects the edge and decrements the counter by one. At decision box 407, the answer to the question is the edge count equal to zero should always be yes unless the central data cycle is extended to two cycles (two edge counts) at box 405 as a matter of design choice. Now at decision box 408, a microprocessor counter or timer, operative in relation to clock 20, is examined to determined whether the value of the timer is greater or less than a threshold value half way between 1.0 milliseconds and 1.25 milliseconds (representing 1000 and 800 hertz respectively). This threshold value is 1.125 milliseconds. The threshold may be predetermined at this value or based on a running calculated average period value for incoming received TSK encoded data. In the dynamic threshold determining embodiment, the receiver may be made to be independent of the choice of frequencies. If the answer is yes at box 408, then the data bit value is set to "0" at box 409. If the answer is no, then the data bit value is set to "1" at box 410.

At box 411 the data bit value is stored and the register of memory 30 rotated to be ready to receive the next successive data bit value received. Then, at decision box 412, the question is asked whether the end of message indicator has been received or not. If not, circle A is entered and box 413. If yes, the end of the program is reached.

Box 413 sets the edge counter to two because the total transitionary intervals expected between central data cycles of a three cycle burst is two cycles, one cycle preceding and one cycle following a respective central data cycle. At boxes 402 and 404, the transitionary interval of two cycles is ignored. (Previously, at initial burst reception box 401, only one cycle of transitionary interval was ignored).

As before, boxes 404-411 apply to the determination of the period of the centrally transmitted cycle, its comparison with a threshold value and, consequently, the establishment and storage of a data bit value V in memory. Now, after the entire message is received, the end of message indicator signals the END of the algorithm.

Figure 7:
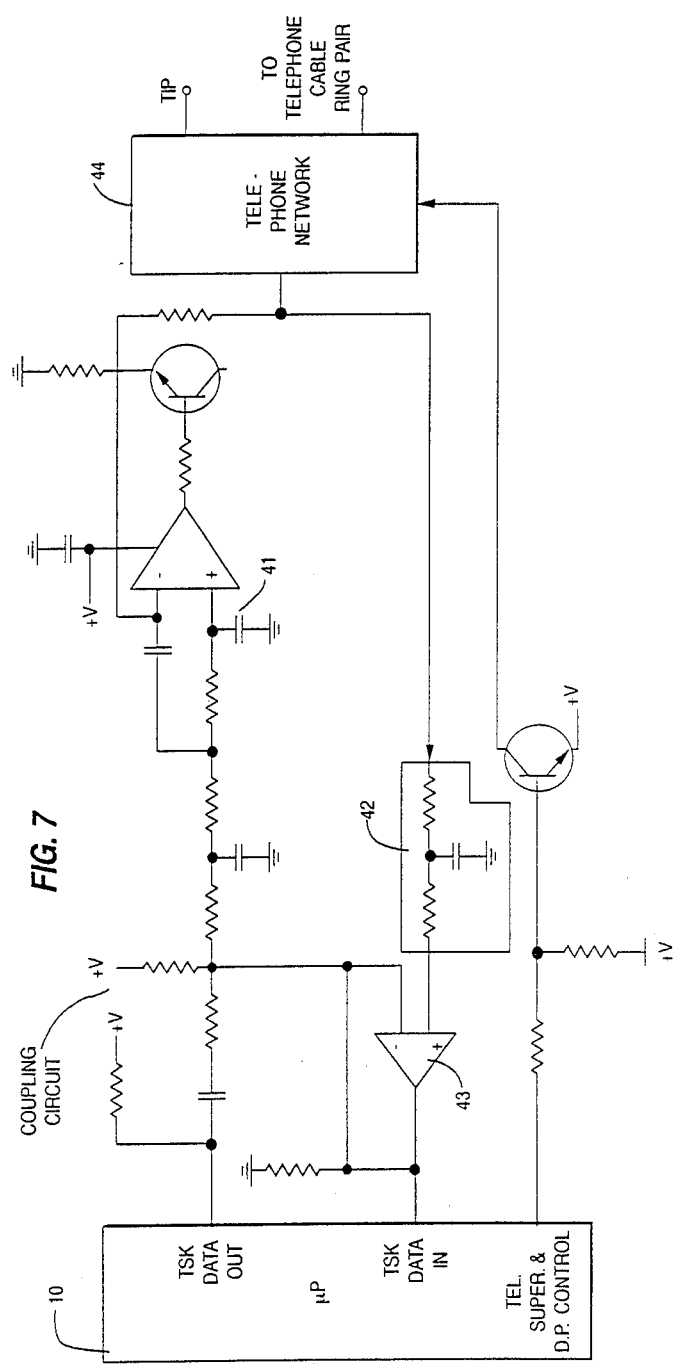
FIG. 7 is a detailed schematic diagram of the microprocessor and transmission channel interface of FIG. 2 for application as a telephone channel narrowband data modulator/demodulator.

Referring now to FIG. 7, there is shown a detailed block diagram of the circuit of FIG. 2 showing a dynamic reference level setting of the reference level inverting input of comparator 43. Coupled to the TSK data out terminal of microprocessor 10 is an active filter 41 comprising two stages of prefiltering and an RC series coupling circuit. Bandpass filter 42 is shown simply as a passive RC single stage parallel filter. Both active filter 41 and bandpass filter 42 are coupled to telephone network circuit 44 including on/off hook supervision and dial pulsing circuitry.

Microprocessor 10 is coupled via a telephone supervision and dial pulse control terminal and a switching transistor to a control input of telephone network 44. Consequently, microprocessor 10 is capable of controlling the process of going off hook and of subsequently transmitting a dial pulsed telephone number control signal to establish a remote connection. Telephone network 44 may also, on detection of ringing current, go off hook to answer a call under control of microprocessor 10.

The dynamic reference level setting of comparator 43 is represented by a connection of the inverting input of comparator 43 to its output and to a terminal connecting the RC series coupling circuit with the first stage of active filter 41. By this connection of the inverting input of comparator 43, the relative power levels of data transmission and reception at microprocessor 10 are maintained approximately constant.

Figure 8:
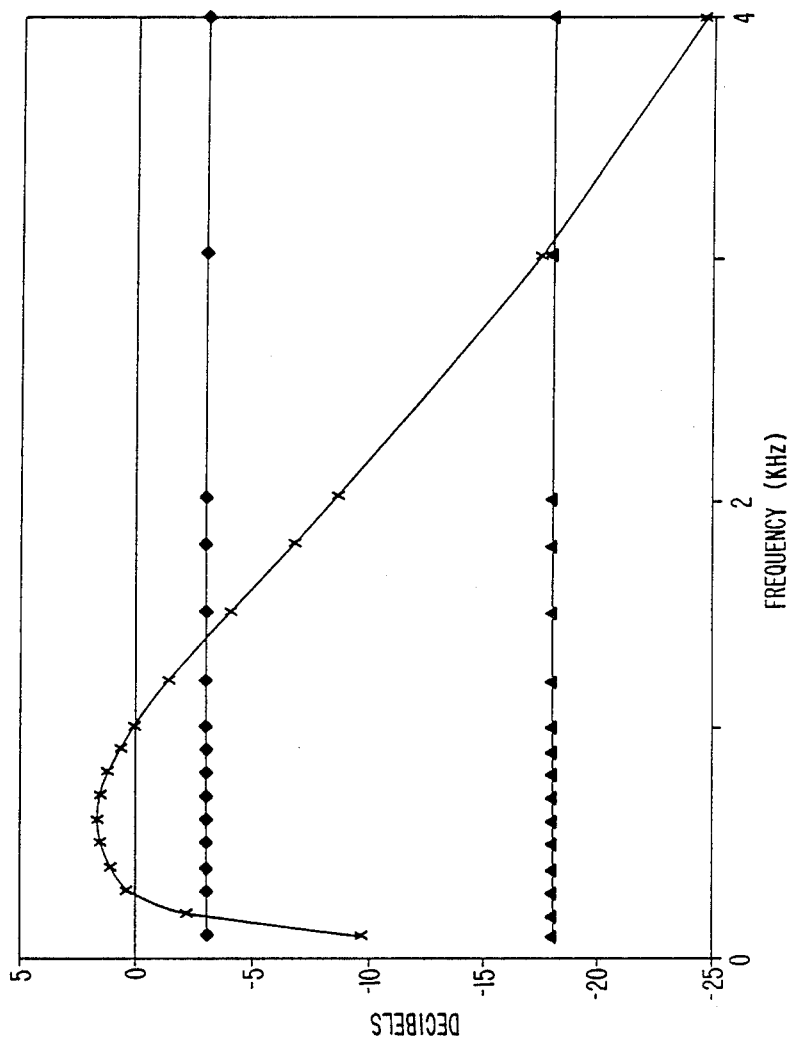
FIG. 8 is an exemplary bandpass filter characteristic for an active filter of the telephone channel interface circuit shown in FIG. 7.

The embodiment of FIG. 7 assumes a dual frequency, 800 and 1000 hertz, period shift keyed data output of active filter 41. Referring briefly to FIG. 8, there is shown an exemplary filter characteristic for the active bandpass filter 41 shown in FIG. 7. Other multifrequency embodiments or applications with different transmission channels or electronic apparatus 1a or 1b (FIG. 1) will readily come to mind to one of skill in the art and, consequently, the present invention is only limited by the claims which follow.

We claim:

1. A method for transmitting data by period shift keying, the data to be transmitted having a plurality of data values, each data value being represented by a different predetermined frequency, the data transmission method comprising the steps of:
storing period values of the predetermined frequencies of the plurality of data values to be transmitted and
generating a waveform having a predetermined number of cycles at the different predetermined frequency for each data value, said waveform consisting of a predetermined transitionary interval and at least one period for each data value to be transmitted, one portion of the predetermined transitionary interval preceding and a remaining portion following the at least one period for each data value to be transmitted, the generated waveform beginning at an edge of a pulse and including at least two additional pulse edges.

2. The data transmission method of claim 1 wherein the predetermined transitionary interval comprises two cycles.

3. The data transmission method of claim 2 wherein each transitionary interval portion comprises one cycle.

4. The data transmission method of claim 1 wherein the plurality of data values comprises binary bit values, zero and one.

5. A method for receiving period shift keyed data on a waveform, the received period shift keyed data having a plurality of data values, each data value being determined by the period of a different predetermined frequency, each data value being represented by the transmission of a predetermined number of cycles at the different predetermined frequency for each data value, the waveform consisting of a predetermined transitionary interval and at least one period for each data value, one portion of the predetermined transitionary interval preceding and a remaining portion following the at least one period for each data value, the data reception method comprising the steps of:
storing at least one threshold value associated with the plurality of data values,
sensing the waveform and ignoring transitionary intervals,
calculating the duration of the at least one period for each received data value between at least two successive pulse edges,
comparing the calculated duration of the at least one period with the associated threshold value for the plurality of data values, and
determining the data value from the comparison.

6. The data reception method of claim 5 wherein the predetermined transitionary interval comprises two cycles.

7. The data reception method of claim 6 wherein each transitionary interval portion comprises one cycle.

8. The data reception method of claim 5 wherein the plurality of data values comprises binary bit values, zero and one.

9. The data reception method of claim 5 wherein the threshold value is determined from calculating an average period value for received period shift keyed data.

10. Apparatus for encoding data by period shift keying, the data to be transmitted having a plurality of data values, each data value being represented by a different predetermined frequency, the data encoding apparatus comprising
memory means for storing period values of the predetermined frequencies of the plurality of data values to be transmitted, a predetermined transitionary interval comprising one portion and a remaining portion, and a software algorithm;
means for providing a clock oscillator output at a reference frequency much larger than the predetermined frequencies of the plurality of data values; and
means, responsive to the memory means and the clock means, for controlling the generation of a waveform having a predetermined number of cycles at the different predetermined frequency for each data value, the waveform consisting of the transitionary interval and at least one period for each data value to be transmitted, the one portion of the transitionary interval preceding and the remaining portion following the at least one period of the predetermined frequency for each data value to be transmitted, the generated waveform beginning at an edge of a pulse and including at least two additional pulse edges.

11. Data encoding apparatus of claim 10 wherein the predetermined transitionary interval comprises two cycles.

12. Data encoding apparatus of claim 11 wherein each transitionary interval portion comprises one cycle.

13. Data encoding apparatus of claim 10 wherein the plurality of data values comprises binary bit values, zero and one.

14. Data encoding apparatus of claim 10 further comprising
means, responsive to the waveform generation control means, for conditioning the generated waveform for transmission on a particular transmission channel.

15. Data encoding apparatus of claim 14 wherein the conditioning means comprises an active filter circuit.

16. Apparatus for decoding period shift keyed data on a waveform, the received period shift keyed data having a plurality of data values, each data value being determined by the period of a different predetermined frequency, each data value being represented by the transmission of a predetermined number of cycles at the different predetermined frequency for each data value, the waveform consisting of a predetermined transitionary interval and at least one period for each data value, one portion of the predetermined transitionary interval preceding and the remaining portion following the one period for each data value, the data decoding apparatus comprising
memory means for storing at least one threshold value associated with the period of the different predetermined frequencies of the plurality of data values transmitted, the predetermined transitionary interval comprising the one portion and the remaining portion, and a software algorithm;
means for providing a clock oscillator output at a reference frequency much higher than the predetermined frequencies of the plurality of data values; and
means, responsive to the memory means and the clock means, for controlling the determination of data values from an incoming period shift keyed data waveform by sensing and ignoring transitionary intervals, calculating the duration of the at least one period for each received data value between two successive edges, comparing the calculated duration of the one period with the associated threshold value for the plurality of data values and determining the data value for each received data value from the comparison.

17. The data decoding apparatus of claim 16 wherein the predetermined transitionary interval comprises two cycles.

18. The data decoding apparatus of claim 17 wherein each transitionary interval portion comprises one cycle.

19. The data decoding apparatus of claim 16 wherein the plurality of data values comprises binary data values, zero and one.

20. The data decoding apparatus of claim 16 further comprising
means, coupled to a transmission channel, for conditioning the incoming period shift keyed waveform to an appropriate level and pass band and
means, coupled to the conditioning means, for comparing the output of the conditioning means to a reference voltage, the output of the comparison means being coupled to an input of the data value determination control means.

21. Apparatus for encoding and decoding period shift keyed data, the period shift keyed data having a plurality of data values, each data value being determined by the period of a different predetermined frequency, each data value being represented by the transmission of the different predetermined frequency for a predetermined transitionary interval plus at least one period, one portion of the predetermined transitionary interval preceding and the remaining portion following the one period of the predetermined frequency, the data encoding and decoding apparatus comprising
memory means for storing the periods of the predetermined frequencies of the plurality of data values to be transmitted, at least one threshold value associated with the periods of the predetermined frequencies, the predetermined transitionary interval comprising the one portion and the remaining portion, and a software algorithm;
means for providing a clock oscillator output at a reference frequency much higher than the predetermined frequencies of the plurality of data values; and
means, responsive to the memory means and the clock means, for controlling the generation of a waveform having a predetermined number of cycles of period shift keyed data for each data value to be transmitted and the determination of data values from an incoming period shift keyed data waveform having an equal number of cycles of period shift keyed data for each received data value.

22. The data encoding and decoding apparatus of claim 21 wherein the predetermined transitionary interval comprises two cycles.

23. The data encoding and decoding apparatus of claim 22 wherein each transitionary interval portion comprises one cycle.

24. The data encoding and decoding apparatus of claim 21 wherein the plurality of data values comprises binary bit values, zero and one.

25. The data encoding and decoding apparatus of claim 21 further comprising
a transmission channel interface particularly comprising a first filter coupled to a data output of the controller means at which output is provided the period shift keyed data output, a transmission channel interface network coupled to the output of the first filter and to a transmission channel, a second filter, coupled to the transmission channel interface network, for receiving a data signal from the transmission channel, and a comparator, coupled to a data input of the controller means and to an output of the first filter.

26. The data encoding and decoding apparatus of claim 25 wherein the first filter further provides a dynamic reference level input to the comparator for comparison with the output of the second filter.

27. The data encoding and decoding apparatus of claim 26 wherein the dynamic reference level input to the comparator is coupled to the output of the comparator and the data input of the controller means.

28. The data encoding and decoding apparatus of claim 25 further comprising a telephone network circuit coupled between the transmission channel interface and the transmission channel, the transmission channel comprising a telephone channel, the controller means for further controlling the operation of the telephone network circuit.

29. A data encoding method for transmission of data on a waveform comprising the steps of:
(a) fetching a data value;
(b) determining a predetermined half period corresponding to said fetched data value;
(c) generating said waveform by toggling an output state of an output signal and starting a timer to time said predetermined half period;
(d) returning to step (c) when said timer has finished timing said predetermined half period until a predetermined number "n" of toggled output states have been toggled for said fetched data value; and
(e) returning to step (a) for transmitting another data value.

30. The data encoding method of claim 29, wherein "n" is at least 6.

31. A data decoding method for reception of data on a waveform comprising the steps of:
(a) sensing an integral number "p" of transitions of said waveform, wherein "p" is greater than zero;
(b) sensing a further transition of said waveform and marking a reference time;
(c) sensing an integral number "q" of additional transitions of said waveform, wherein "q" is greater than zero, and determining elapsed time since said further transition at said marked reference time;
(d) comparing said elapsed time with predetermined thresholds;
(e) generating a signal comprising a data value in response to said comparison; and
(f) repeating steps (a) through (e) to receive another data value on said waveform.

32. The data decoding method of claim 31, wherein "p" is at least 2 and "q" is at least 1.

33. The data decoding method of claim 31, wherein said transitions consist of either rising edges or falling edges.

* * * * *